United States Patent
Miya et al.

(10) Patent No.: US 6,952,152 B2
(45) Date of Patent: Oct. 4, 2005

(54) WINDING FIXING STRUCTURE OF A ROTARY TRANSFORMER-TYPE RESOLVER

(75) Inventors: Taiichi Miya, Tokyo (JP); Mutsumi Matsuura, Tokyo (JP)

(73) Assignee: Minebea Co., Ltd., Nagano-ken (JP)

( * ) Notice: Subject to any disclaimer, the term of this patent is extended or adjusted under 35 U.S.C. 154(b) by 91 days.

(21) Appl. No.: 10/681,737

(22) Filed: Oct. 9, 2003

(65) Prior Publication Data

US 2004/0150395 A1 Aug. 5, 2004

(30) Foreign Application Priority Data

Oct. 9, 2002 (JP) ........................................ 2002-296456

(51) Int. Cl.$^7$ .............................................. H01F 21/04
(52) U.S. Cl. ........................ 336/115; 336/117; 336/130; 336/131
(58) Field of Search ................................. 336/115, 117, 336/118, 130, 131–132; 324/207.11, 207

(56) References Cited

U.S. PATENT DOCUMENTS

| | | | | |
|---|---|---|---|---|
| 3,717,029 A | * | 2/1973 | Tveter | 74/136 |
| 4,345,230 A | * | 8/1982 | Chass | 336/135 |
| 5,705,872 A | * | 1/1998 | Loge | 310/161 |
| 6,038,761 A | * | 3/2000 | Meiler et al. | 29/605 |
| 6,118,201 A | * | 9/2000 | Dulin et al. | 310/161 |
| 2003/0102949 A1 | * | 6/2003 | Matsuura et al. | 336/198 |
| 2004/0046627 A1 | * | 3/2004 | Tezuka et al. | 336/115 |

FOREIGN PATENT DOCUMENTS

| | | |
|---|---|---|
| JP | A-63-318725 | 12/1988 |
| JP | U-H5-4427 | 1/1993 |

* cited by examiner

*Primary Examiner*—Anh Mai
(74) *Attorney, Agent, or Firm*—Adduci, Mastriani & Schaumberg, L.L.P.

(57) ABSTRACT

A spacer 2 is provided between an inner core 62 and a resolver rotor 63, which are respectively attached to a rotary shaft 68. A cutout groove 42 is formed at a flange 41 of the inner core 62. A fixing groove 3 and the cutout groove 42 are aligned in the rotary shaft 68 direction. The rotary transformer output winding 65 and resolver excitation windings 64 are soldered and electrically connected by a crossover 60. The crossover 60 is covered with an insulating tube 6. The crossover 60 is fitted into the fixing groove 3. The fixing groove 3 and an inter-magnet space 631 are misaligned in the circumferential direction of the rotor 63. Thus, a frictional force is applied between the insulating tube 6 and the fixing groove 3, which secures the crossover 60 and prevents the crossover 60 from escaping from the fixing groove 3.

14 Claims, 5 Drawing Sheets

WINDING FIXING STRUCTURE OF A ROTARY TRANSFORMER-TYPE RESOLVER

CROSS REFERENCE TO RELATED APPLICATION

This application is based on and incorporates by reference Japanese Patent Application No. 2002-296456, which was filed on 9 Oct. 2002.

BACKGROUND OF THE INVENTION

The present invention relates to a winding fixing structure of a rotary transformer-type resolver, and more particularly to a winding fixing structure that secures a crossover that connects a rotary transformer output winding and resolver excitation windings of a rotary transformer-type resolver.

Among rotary transformer-type resolvers that perform AC excitation of the resolver rotor, there are conventional resolvers in which a rotating coil and resolver rotor are secured to the rotary shaft, and the rotating coil and the resolver rotor coils are respectively bound by cord and secured by a compound (for example, see FIG. 2 of Japanese Unexamined Patent Application Publication S63-318725). In addition, there are resolvers in which a printed wiring board is located between the rotation side coil and the resolver rotor coils. The terminal of the rotation side coil is connected by solder to a through hole formed in the printed wiring board, and the terminal of the rotor coil, which is wound around the resolver rotor, is connected to the same through hole (for example, see FIG. 1 of Japanese Unexamined Utility Model Application Publication H5-4427).

In addition, as shown in FIG. 13, there are known resolvers in which a wire (referred to herein as a crossover) that connects the rotary transformer output winding 65 and the resolver excitation windings 64 is soldered, the crossover is covered with an insulating tube 6, and the crossover, which has been covered with the insulating tube 6, is secured to the rotary shaft 68 by a cord 61. The resolver shown in FIG. 13 includes a resolver stator 71, which has resolver stator windings 70, and an outer core 66, which has a stator transformer winding 67. A shield plate 69, which shields against magnetic flux leakage from the outer core 66, is oriented radially between the resolver stator 71 and the outer core 66. In addition, a resolver rotor 63, which has resolver excitation windings 64, and an inner core 62, which has a rotary transformer output winding 65, are located adjacent to one another on the rotary shaft 68. The resolver excitation windings 64 are mutually connected from the rotary transformer output winding 65 with a crossover. The respective lead wires are soldered at the crossover, which is covered with an insulating tube 6, and the crossover is secured to the rotary shaft 68 by a cord 61.

However, in the resolver of Japanese Unexamined Patent Application Publication S63-318725, no treatment of the crossover is performed, which reduces the reliability of the resolver. In addition, in Japanese Unexamined Utility Model Application Publication H5-4427, the terminal of the rotation side coil and the terminal of the rotor coil wound around the resolver rotor are directly connected to the same through hole, and the wire that is between the rotary shaft and the through hole extends for a substantial distance. As a result, when used in a severe usage environment, such as in an automobile that has vibration, the crossover may become loose, disconnected, or may cause a short circuit.

In addition, as shown in FIG. 13, when the respective lead wires are soldered at the crossover, which is covered with the insulating tube 6, and the crossover is secured by means of a cord 61 to the rotary shaft, it is difficult and time consuming to tightly bind the crossover with a cord 61, because the space between the rotary transformer output winding 65 and the resolver rotor 63 is narrow. The outlets of the resolver excitation windings 64 are determined by the number of magnets, the phase of the drive voltage, etc., and when the rotor is secured to the rotary shaft 68, the outlets of the resolver excitation windings 64 are uniquely determined with respect to the rotary shaft 68. The rotary transformer output winding 65 is connected to the resolver excitation windings 64 with the crossover, but if the position of the rotary transformer output winding 65 with respect to the rotary shaft 68 is not taken into account, the length of the crossover may increase. As a result, even if the crossover is secured by a cord 61, the crossover may come into contact with the inner core 62, the resolver stator 71, or other parts, which may result in disconnections.

SUMMARY OF THE INVENTION

An object of the invention is to provide a winding fixing structure of a rotary transformer-type resolver that solves the problems mentioned above and securely fixes a crossover.

Basically, the invention is a rotary transformer-type resolver in which an inner core, which is equipped with flanges at its ends, is located on a shaft, and a rotary transformer output winding is wound on the inner core. A resolver rotor, on which resolver excitation windings are wound, is secured to the rotary shaft so that the inner core and the rotor are coaxial and adjacent to one another. A spacer is provided between the inner core and the resolver rotor. A fixing groove is formed in the spacer. A crossover, which connects the rotary transformer output winding and the resolver excitation windings, is located in the spacer.

In another aspect of the invention, a cutout groove, which accommodates the crossover, is formed in one of the flanges, and the fixing groove and the cutout groove are aligned in the axial direction of the rotary shaft.

In another aspect of the invention, a notch is formed is in the rotor, and the notch and the fixing groove are misaligned, or offset in the circumferential direction.

In another aspect of the invention, a plurality of fixing grooves is formed in the spacer, and an equal number of cutout grooves are formed in the inner core.

In another aspect of the invention, the fixing grooves formed in the spacer are such that the number of fixing grooves is equivalent to the number of windings leading out from the rotor.

In another aspect of the invention, the fixing groove is formed such that the groove becomes narrow at its outmost part.

In another aspect of the invention, one of the flanges serves as a spacer.

BRIEF DESCRIPTION OF THE DRAWINGS

The accompanying figures, in which like reference numerals refer to identical or functionally similar elements throughout the separate views and which, together with the detailed description below, are incorporated in and form part of the specification, serve to further illustrate various embodiments and to explain various principles and advantages all in accordance with the present invention.

DETAILED DESCRIPTION OF THE PREFERRED EMBODIMENTS

Figure 1:
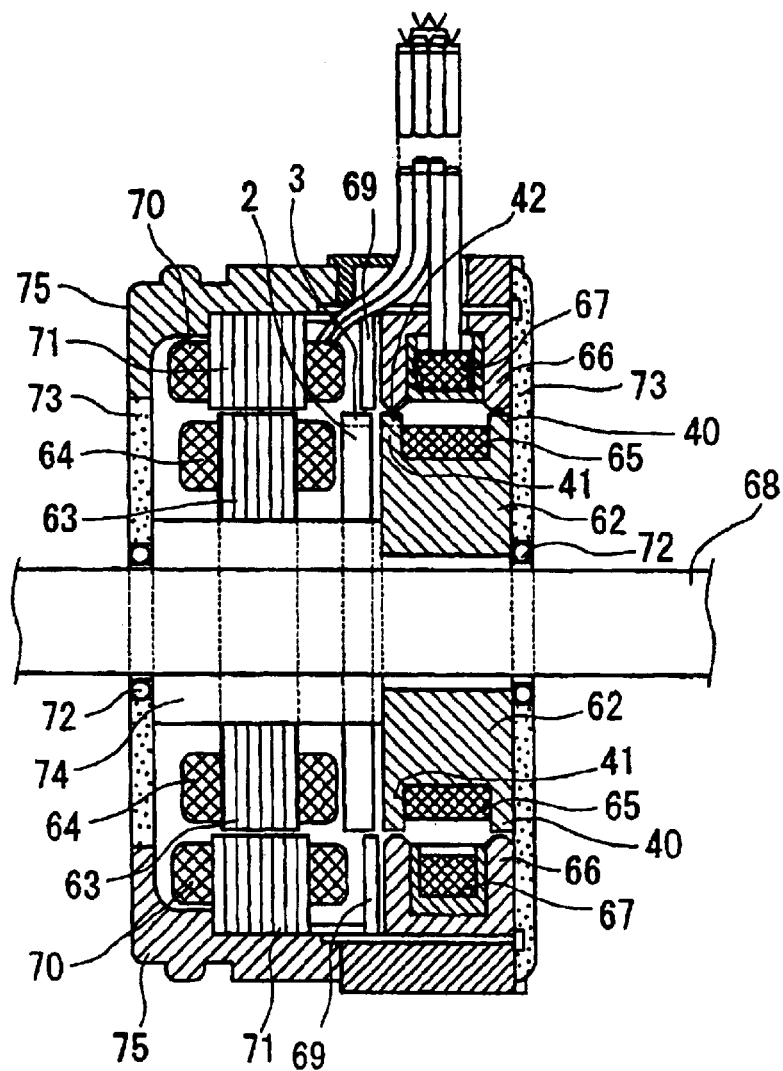
FIG. 1 is a partial cross sectional view that shows one embodiment of the winding fixing structure of the resolver of the present invention.
Figure 13:
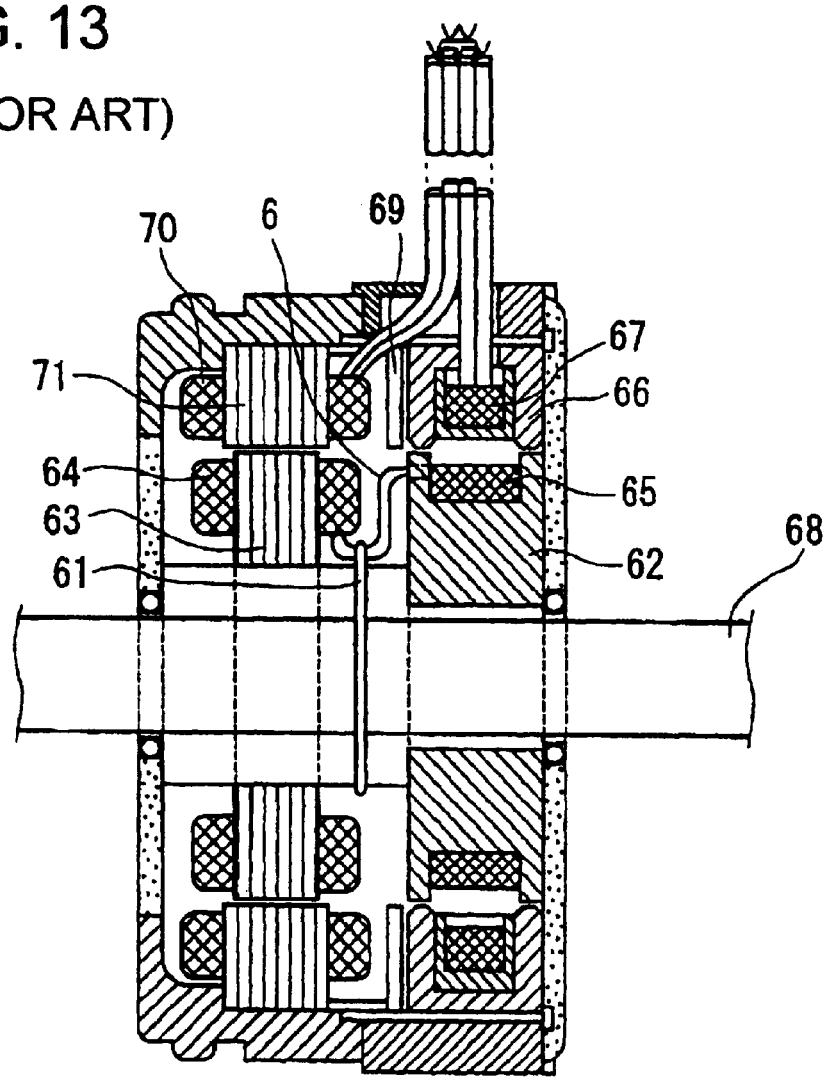
FIG. 13 is a cross-sectional view that shows a conventional resolver winding fixing arrangement.

Referring to FIG. 1, the crossover to be described below is not shown, and like or the same reference numbers are applied to parts that are like or the same as those in FIG. 13. Located within an annular case 75 is a rotary transformer. The rotary transformer includes a resolver section, which includes of a resolver stator 71 and a resolver rotor 63. Further, the rotary transformer includes an inner core 62 and an outer core 66. Located on the case 75 are a resolver stator 71, which has resolver stator windings 70, and an outer core 66, which has a stator transformer winding 67. A shield plate 69, which shields against magnetic flux leakage from the inner core 62, is fixed in a radial orientation between the resolver stator 71 and the outer core 66.

As shown in FIG. 1, a resolver rotor 63, which has resolver excitation windings 64, and an inner core 62, which has a rotary transformer output winding 65, are adjacent to one another on a rotary shaft 68. The shaft 68 freely rotates inside the case 75. The resolver stator 71, resolver rotor 63, inner core 62 and outer core 66 are all formed by layering silicon steel plates. The outer core 66 stops at the case 75, as shown. The resolver excitation windings 64 are connected with the rotary transformer output winding 65, and current supply and inputting and outputting of signals with respect to the resolver excitation windings 64 are performed with the rotary transformer output winding 65.

Figure 2:
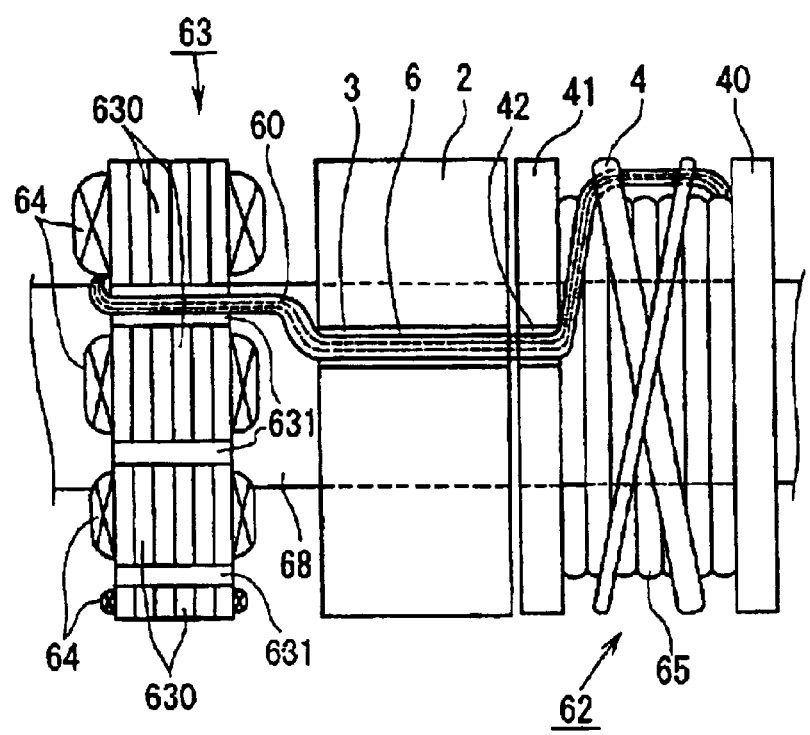
FIG. 2 is a partial plan view that shows the winding fixing structure of the resolver of FIG. 1.

The inner core 62 and the resolver rotor 63 are engaged with a shaft holder 74 and are thus secured to the rotary shaft 68. The rotary shaft 68 is rotatably held by a cover 73 through bearings 72. The cover 73 is fixed to the case 75 by bonding or screw fastening. As shown in FIG. 1, the rotary transformer output winding 65 is wound on the shaft of the rotary transformer, and flanges 40, 41 are formed at both ends of the rotary transformer output winding 65. As shown in FIG. 2, a cutout groove 42, which accommodates the rotary transformer output winding 65, is formed at the flange 41 that is nearest to the resolver rotor 63. A spacer 2 is provided on the rotary shaft 68 between the inner core 62 and the resolver rotor 63. It is preferred that the spacer 2 be a magnetic body with the ability to shield against magnetic flux leakage, but it may be another material such as a synthetic resin.

A fixing groove 3 accommodates and secures a crossover 60 (unillustrated in FIG. 1), which is for connecting the rotary transformer output winding 65 and the resolver excitation windings 64. The fixing groove 3 is formed in the spacer 2. The crossover 60 is covered with an insulating tube 6 (see FIG. 2), and it is set into the fixing groove 3. As a result, the crossover 60, which is covered by the insulating tube 6, is secured to the spacer 2. This securing method may include impregnation and securing with varnish during varnish impregnation of the rotary transformer output winding 65, for example. Alternatively, the crossover 60 may be secured with another bonding material. The crossover 60 is securely attached to the rotary shaft 68, and nonconformities by which the crossover may become loose, disconnected, or short circuited due to vibration no longer occur.

Referring to FIG. 2, the rotary transformer output winding 65 is wound around the inner core 62, and it is secured by a cord 4 to the rotary shaft 68 along with the crossover 60.

Note that the crossover 60 maybe secured along with the rotary transformer output winding 65 by a varnish impregnation process instead of using the cord 4. The resolver excitation windings 64 are respectively wound on a plurality of rotor magnets 630, which are on the resolver rotor 63. Inter-magnet spaces 631, or gaps, are formed between the rotor magnets 630. The inner core 62, the resolver rotor 63 and the spacer 2 are respectively secured to the rotary shaft 68. A cutout groove 42 that accommodates the crossover 60 is formed in the flange 41 that is nearest to the spacer 2. The fixing groove 3, which is formed in the spacer 2, and the cutout groove 42 are aligned in the axial direction of the rotary shaft 68. This construction facilitates soldering of the rotary transformer output winding 65 and the resolver excitation windings 64.

Figure 3:
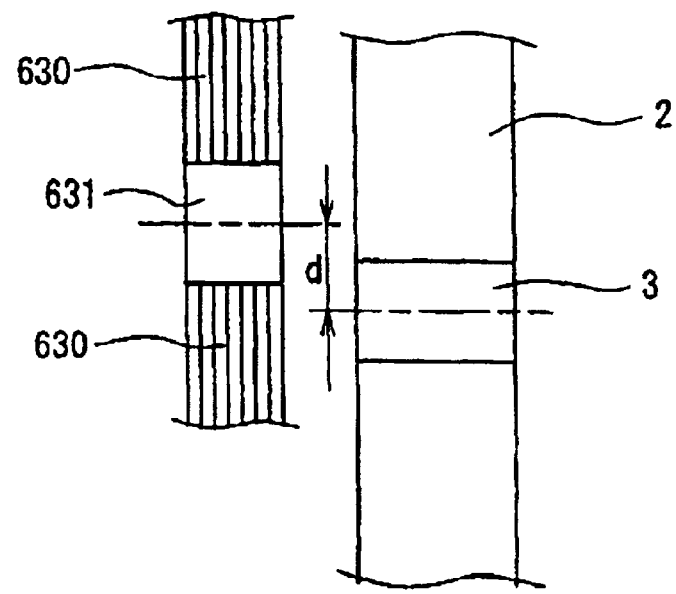
FIG. 3 is diagrammatic plan view that shows the relationship between the fixing groove and the inter-magnet space of the resolver rotor.

The soldered rotary transformer output winding 65 and resolver excitation windings 64 are covered with an insulating tube 6, and the crossover 60 is formed. The crossover 60, which is covered with the insulating tube 6, is set into the fixing groove 3 on the stator 2. The fixing groove 3 and the inter-magnet space 631 are misaligned, or offset in the circumferential direction, as shown in FIG. 3. That is, if the distance between the respective centers of the fixing groove 3 and the inter-magnet space 631 is considered to be d, then d>0, and the distance d is such that stress resulting from the misalignment of the respective centers of the fixing groove 3 and the inter-magnet space 631 is applied to the insulating tube 6, which is in the fixing groove 3. A frictional force is applied between the insulating tube 6 and the fixing groove 3 due to the stress. For this reason, the crossover 60 cannot escape from the fixing groove 3.

Figure 4:
FIGS. 4, 5, and 6 are perspective diagrams that show various embodiments of the fixing groove (or grooves) of the spacer of the present invention.
Figure 5:
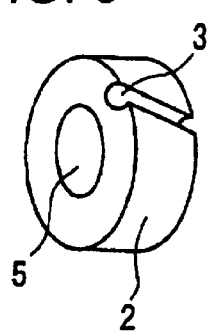
Figure 6:
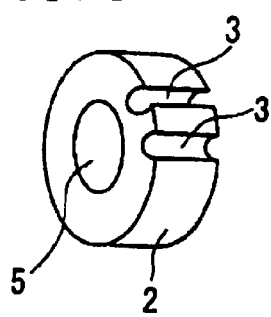
Figure 7:
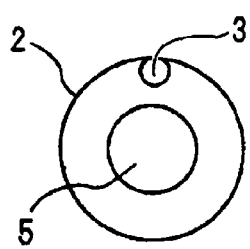
FIGS. 7, 8, 9 and 10 are perspective diagrams that show various embodiments of the spacer of the present invention.
Figure 8:
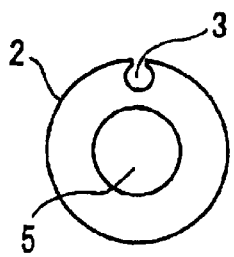
Figure 9:
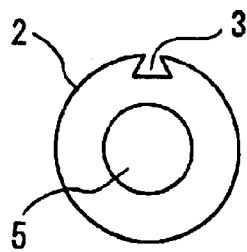
Figure 10:
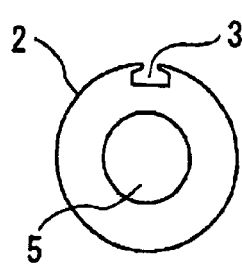

The shape of the fixing groove 3 of the spacer 2 may be as shown in FIGS. 4–6. The fixing groove 3 may extend in a direction parallel to the rotary shaft 68 (FIG. 4), a direction that is inclined (FIG. 5)), or there may be a plurality of fixing grooves 3 (FIG. 6). In any case, the fixing groove 3 and the inter-magnet spaces 631, or gaps, are misaligned, or offset in the circumferential direction, in the manner shown in FIG. 3. However, if there is a plurality of fixing grooves 3 in the spacer 2, there is also a corresponding plurality of cutout grooves 42 formed in the inner core 62. In such an arrangement, the number of fixing grooves is the same as the number of cutout grooves 42; and separate resolver excitation windings 64 are set into the fixing grooves 3 and the cutout grooves 42 respectively. In addition, each of the fixing grooves 3 of the plurality of fixing grooves 3 is misaligned, or offset in the circumferential direction, with respect to each of the inter-magnet spaces 631, or gaps. If there is a plurality of fixing grooves 3, the respective windings of the resolver excitation windings 64 can be placed in a fixing groove 3 and secured separately. As a result, damage resulting from contact between windings is prevented, and the mutual dielectric strength is also improved. Note that in FIGS. 4–10, a center hole 5 receives the rotary shaft 68 such that the spacer 2 rotates integrally with the rotary shaft 68.

The cross-sectional shape of the fixing groove 3 may be as shown in any of FIGS. 7–10. Specifically, the fixing groove 3 may be arcuate and formed near the surface of the spacer 2 (FIG. 7), arcuate and spaced radially inward from the surface with a narrow aperture (FIG. 8), trapezoidal (FIG. 9), or a polygonal with a narrow aperture. By forming the aperture such that the aperture becomes narrower in the radial direction, the insulating tube 6 is secured and cannot escape from the fixing groove 3. Although FIGS. 7–10 do not show the cutout groove 42, it is understood that the cutout groove 42 may have the same configuration as the fixing groove 3.

Figure 11:
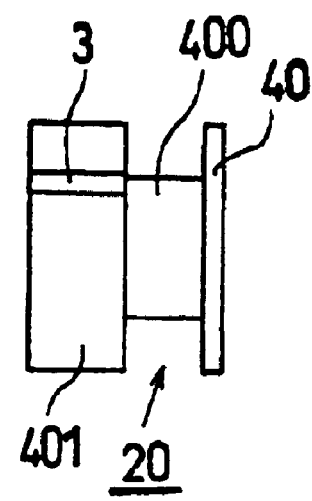
FIG. 11 is a side view that shows another embodiment of the spacer of the present invention.
Figure 12:
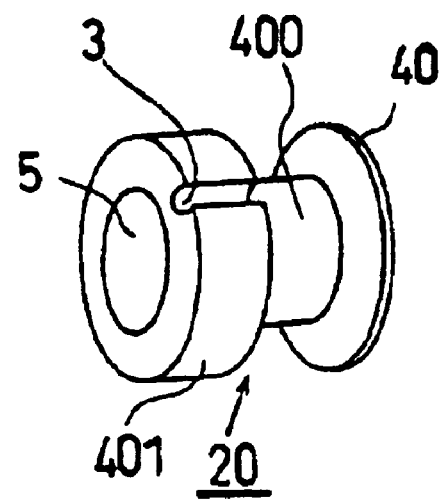
FIG. 12 is a perspective view of the spacer of FIG. 11.

As shown in FIGS. 11 and 12, a spacer 401 may be integral with an inner core 20. In this embodiment, the flange of the inner core 20 that is nearest to the resolver rotor 63 forms the spacer 401. In other words, the flange is extended axially to form the spacer 401. The inner core 20 that includes the integral spacer 401 is made of magnetic material such as layered silicon steel plates, for example. A fixing groove 3 is formed in the spacer 401 in the manner of the embodiment of FIG. 1 and as shown in FIGS. 11 and 12. By integrating the spacer and the inner core in this way, the resolver is smaller and less expensive, and the spacer 401 of the inner core 20 is such that the area that opposes the outer core 66 is increased. As a result, magnetic flux, which leaks from the inner core 20 to the outer core 66, decreases, and the performance of the resolver is improved.

As in the embodiment of FIG. 1, The fixing groove 3 that is formed in the inner core 20 of FIGS. 11 and 12 may have any of the cross sectional shapes shown in FIGS. 7–10, for example. Further, there may be a plurality of fixing grooves 3 in the inner core 20 of FIGS. 11 and 12.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiments were chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A rotary transformer-type resolver comprising:
   an inner core, on which a rotary transformer output winding is wound, wherein the inner core includes at least one flange;
   a resolver rotor, on which resolver excitation windings are wound, wherein the resolver rotor and the inner core are coaxial and are constructed to be secured to a rotary shaft;
   a spacer located between the inner core and the resolver rotor, wherein a fixing groove is formed in the spacer, and a crossover, which connects the rotary transformer output winding and the resolver excitation windings is accommodated by the fixing groove.

2. The rotary transformer-type resolver according to claim 1, wherein a cutout groove, which accommodates the crossover, is formed in the flange, and the fixing groove and the cutout groove are aligned in an axial direction of the resolver.

3. The rotary transformer-type resolver according to claim 1, wherein a gap is formed in the rotor, and the fixing groove is offset from the gap in a circumferential direction of the rotor.

4. The rotary transformer-type resolver according to claim 3, wherein the crossover passes through the gap.

5. The rotary transformer-type resolver according to claim 3, wherein the rotor includes angularly spaced magnets, and the gap is a space between an adjacent pair of the magnets.

6. The rotary transformer-type resolver according to claim 1, wherein a plurality of fixing grooves is formed in the spacer and a plurality of corresponding cutout grooves is formed in the inner core.

7. The rotary transformer-type resolver according to claim 1, wherein the fixing groove is one of a plurality of fixing grooves formed in the spacer, and the number of fixing grooves is equivalent to a number of windings leading out from the rotor.

8. The rotary transformer-type resolver according to claim 1, wherein the fixing groove formed in the spacer has an outwardly facing aperture, and the aperture narrows in the radial direction of the spacer.

9. The rotary transformer-type resolver according to claim 1, wherein the spacer is integral with the flange.

10. A rotary transformer-type resolver comprising:
    a resolver rotor, on which resolver excitation windings are wound, wherein the resolver rotor is constructed to receive a rotary shaft;
    an inner core, on which a rotary transformer output winding is wound, wherein the inner core is constructed to be coaxial to the rotor when fitted to a rotary shaft, and the inner core includes a first flange and a second flange, wherein the first flange is spaced apart axially from the second flange, and the first flange, which is located between the rotary transformer output winding and the rotor, is extended in an axial direction, such that the axial dimension of the first flange is greater than that of the second flange, to form a spacer, and a fixing groove is formed in the spacer; and
    a crossover, which connects the rotary transformer output winding and the resolver excitation windings, wherein the crossover is fitted in the fixing groove to secure the crossover to the spacer.

11. The rotary transformer-type resolver according to claim 10, wherein a gap is formed in the rotor, and the fixing groove is offset from the gap in the circumferential direction of the rotor.

12. The rotary transformer-type resolver according to claim 11, wherein the crossover passes through the gap.

13. The rotary transformer-type resolver according to claim 11, wherein the rotor includes angularly spaced magnets, and the gap is a space between an adjacent pair of the magnets.

14. A rotary transformer-type resolver comprising:
    an inner core, on which a rotary transformer output winding is wound, wherein the inner core includes at least one flange;
    a resolver rotor, on which resolver excitation windings are wound, wherein the resolver rotor and the inner core are coaxial and are constructed to be secured to a rotary shaft, and angularly spaced magnets are located on the rotor, and an inter-magnet spaces exist between the magnets;
    a spacer located between the inner core and the resolver rotor, wherein a fixing groove is formed in the spacer;
    a crossover, which connects the rotary transformer output winding and the resolver excitation windings, wherein the crossover passes through a first one of the inter-magnet spaces and is fitted within the fixing groove, and the fixing groove is offset from the first one of the inter-magnet spaces in a circumferential direction of the rotor, such that the crossover follows a non-linear path between the rotary transformer output winding and the resolver excitation windings.

* * * * *